United States Patent [19]
Stief et al.

[11] Patent Number: 5,462,331
[45] Date of Patent: Oct. 31, 1995

[54] WHEEL LINING

[75] Inventors: Reinhard Stief, Weinheim; Gerhard Müller-Broll, Rimbach; Thomas Jost, Weinheim; Manfred Mattutat, Ladenburg; Klaus-Dieter Schmitt, Gorxheimertal, all of Germany

[73] Assignee: Firma Carl Freudenberg, Weinheim, Germany

[21] Appl. No.: 164,587

[22] Filed: Dec. 9, 1993

[30] Foreign Application Priority Data

Dec. 10, 1992 [DE] Germany ................ 42 41 518.7

[51] Int. Cl.⁶ ................................................. B62B 9/14
[52] U.S. Cl. ........................................... 296/198; 280/847
[58] Field of Search ...................... 296/39.1, 39.3, 296/198; 280/847, 848, 849, 850, 851; 181/198

[56] References Cited

U.S. PATENT DOCUMENTS

| 4,735,427 | 4/1988 | Fuchs ........................ 296/198 X |
| 5,000,483 | 3/1991 | Blumel et al. ................ 296/198 X |

FOREIGN PATENT DOCUMENTS 249878  11/1986  Japan ................... 296/39.3

Primary Examiner—Joseph D. Pape
Attorney, Agent, or Firm—Kenyon & Kenyon

[57] ABSTRACT

A wheel lining with a structure made of a polymer, mounted at a distance from wheel, self-supporting, and impermeable to air. The lining is double-walled and incorporates at least two chambers. The walls of the chambers the facing the wheel are provided with at least one opening each to form Helmholtz resonators.

12 Claims, 5 Drawing Sheets

WHEEL LINING

FIELD OF THE INVENTION

The invention relates generally to a lining for a wheel, and more particularly to a wheel lining having a self-supporting, air-impermeable structure mounted at a distance from the wheel.

BACKGROUND OF THE INVENTION

Such linings are generally known and are used for example as wheel housing linings to protect an automobile body against stone impacts and spray on the inside of fenders. However, it should be noted that as the wheel rolls, depending on the road surface and the tire profile, acoustically-disturbing sound waves are produced.

SUMMARY AND ADVANTAGES OF THE INVENTION

An object of the invention is to provide a wheel lining which absorbs sound resulting from the wheel.

The present invention therefore provides a wheel lining mounted at a distance from a wheel comprising a structure having a first wall facing the wheel and a second wall facing away from the wheel, the structure having at least two chambers formed between the first and second walls, each chamber having at least one opening facing the wheel so as to form a Helmholtz resonator. The structure can further comprise a third wall outside the second wall, with a second set of chambers being formed between the second wall and third wall.

As stated, the present invention provides that the structure is at least double-walled and incorporates at least two chambers, with the walls of the chambers facing the wheel each being provided with at least one opening to form a Helmholtz resonator. It is advantageous in this respect that the self-supporting molded structure, for efficient sound absorption, be readily exchangeable with existing linings, since the space requirements essentially correspond to the space requirements of the linings used heretofore. The double-walled construction of the structure produces cavities formed by chambers, with the walls of the chambers facing the sound being provided with openings that preferably have a diameter of 1 to 14 mm. Depending on the sizes of the chambers and the openings, the lining can be tuned to different frequency ranges. Damping properties are achieved with suitable designs of the lining in a frequency range from approximately 300 to 4800 Hz. The surface of the molded part is preferably covered with a plurality of Helmholtz resonators of different sizes, to achieve optimum acoustic effectiveness over a broad frequency range. The resonators are tuned by the Helmholtz formula known to individuals skilled in the art.

According to one advantageous embodiment, the opening is located at the lowest point, when installed, on each chamber. As a result of this design, contaminants which may have entered the chambers when thrown up by the wheels do not remain in the chambers and hence cannot deteriorate the usage properties, but can be carried away again through the openings. The resonance chamber provided for sound absorption always has a matching volume.

As far as ease of manufacture and good survival of the lining during a long service life is concerned, the structure can be made of two sheets of thermally weldable material, with the sheet facing the wheel preferably having a thickness that is three to five times that of the sheet facing away from the wheel. Stones, mud, or spray thrown up by the rotating wheel therefore will not damage the lining.

Depending on the individual circumstances of the application, it is possible for the sheet facing the wheel to have a thickness $\frac{1}{3}$ to $\frac{1}{5}$ that of the sheet facing away from the wheel. In a design of this kind, the comparatively thinner sheet can be covered by an air-permeable, mechanical stressable covering, made for example of a corrosion-resistant fleece. The thin sheet is protected against damage by this design.

According to another embodiment, provision can be made such that the sheet facing the wheel has a reinforcement in the area outside the openings that ensures high dimensional stability of the lining and offers improved protection against external mechanical influences.

The sheet facing away from the wheel can be provided with cup-shaped depressions when the chambers are formed. As a result of this design, the sheet facing the wheel has an essentially smooth surface, on which no contaminants can settle during a long service life. On the side facing away from the wheel the sheet is shaped by cup-shaped depressions to permit sound absorption according to the Helmholtz principle. In general, there is also the possibility of mounting the sheets in the reverse sequence.

The chambers can be distributed in the structure in the manner of a honeycomb. With a limited space requirement for the lining, this design can produce a plurality of Helmholtz resonators located close together. Tuning to the sound frequencies to be damped is readily possible with this design.

The adjacent chambers at different heights can be linked by drainage openings. The drainage openings can be made in the form of canals. Contaminants that penetrate the chambers can thus be guided out of the cavity bounded by the two adjacent sheets. The sheet facing away from the wheel, provided with cup-shaped depressions, forms a canal-type piping system through which spray water can be carried away for example. The drainage openings can be made in the form of canals.

With an eye toward simple and economically advantageous manufacture, the structure can be formed by deep-drawing. Other manufacturing methods are also feasible, such as blow molding, vulcanization, stamping, and reaction injection molding.

According to another advantageous embodiment, the sheet facing away from the wheel can be covered on the side facing away from the wheel by a polymer shell to form a second set of chambers, while the depressions of the second set of chambers facing the wheel and the adjacent sheet facing the wheel are each provided with openings of essentially matching dimensions. This embodiment with two sets of chambers is known as a double-shell construction. It is advantageous in this regard that the double-shell construction, with a minimum increase in manufacturing costs, produces a significant improvement in effectiveness by doubling the number of Helmholtz resonators.

According to an advantageous embodiment, at least the openings in the sheet facing the wheel can be covered by a corrosion-resistant fleece covering, which preferably has a flow resistance of 400 to 1500 Ns/m$^3$. It is advantageous in this regard that no contaminants can penetrate through the openings into the cavities forming the Helmholtz resonators. This design ensures permanently good usage properties throughout service life without an adverse affect on the effectiveness of the sound absorption.

In the lining according to the invention, the volumes of the individual Helmholtz resonators, their hole radius, and their neck length are variable, whereby, with a limited height, the resonance properties of the sound absorbent elements can be varied.

The materials used are resistant to water, salt, motor vehicle fuels, and cold.

BRIEF DESCRIPTION OF THE DRAWINGS

The lining according to the invention will be described in greater detail with reference to the following drawings.

DETAILED DESCRIPTION

Figure 1:
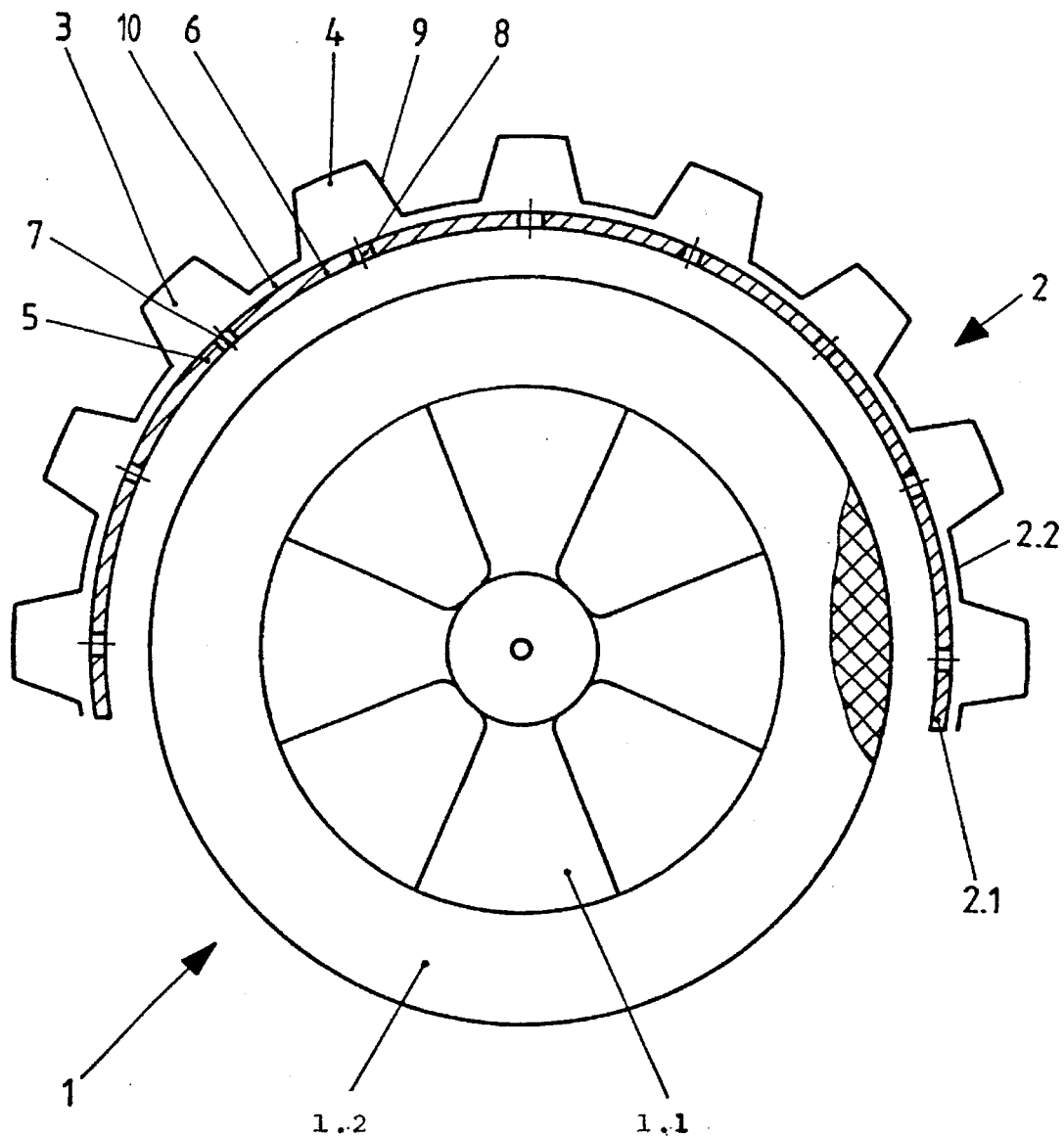
FIG. 1 shows a first embodiment for a lining of a wheel in section.

FIG. 1 shows a rotating wheel 1, comprising a rim 1.1 and a tire 1.2 mounted on rim 1.1. The lining is mounted on the inside of a fender, not shown, of a motor vehicle and consists of a polymer material impermeable to air. The lining is made as a dimensionally stable structure 2, with two walls between which are a plurality of chambers 3, 4. Chambers 3, 4 are defined on the side facing wheel 1 by corresponding wall sections 5, 6 and on the side away from wheel 1 by cup-shaped depressions 9. Wall sections 5, 6 in this embodiment are provided with openings 7, 8, respectively, so that they produce sound absorption according to the Helmholtz principle. Openings 7, 8 in this embodiment have a diameter of 3.5 mm. Structure 2 comprises two walls, sheets 2.1, 2.2, that are thermally welded. Sheet 2.1 facing wheel 1 in this embodiment is three times thicker than sheet 2.2 facing away from wheel 1 in order reliably to avoid any damage from impact on sheet 2.1 of water, oil, sludge, and thrown-up stones. Chambers 3, 4 adjacent to one another circumferentially are connected together by drainage openings 10. Contaminants that have penetrated during proper use into chambers 3, 4 can thus be removed from the chambers so that constant usage properties with regard to sound absorption are ensured.

Figure 2:
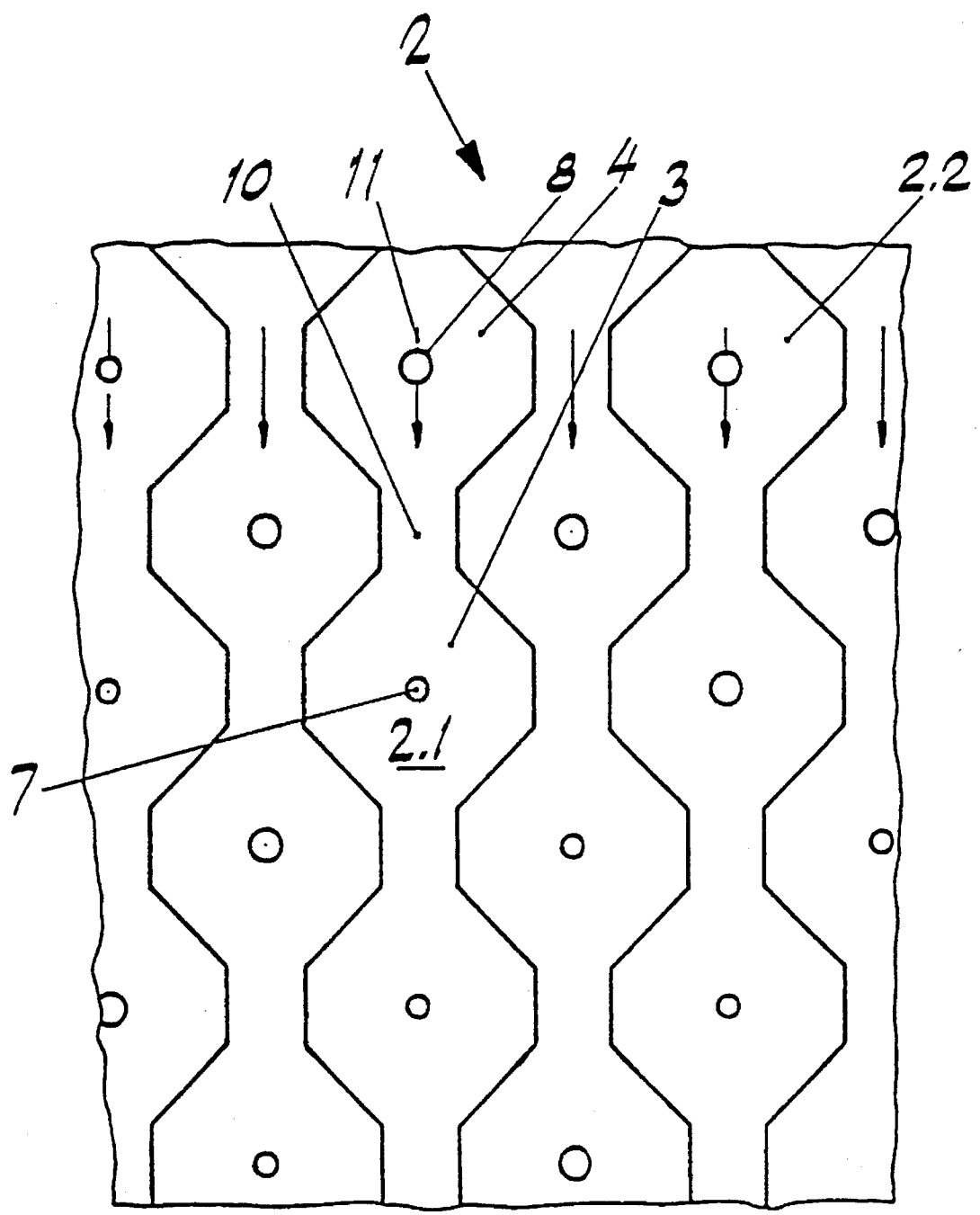
FIG. 2 is a plan view of the lining in FIG. 1.

FIG. 2 is a plan view of the lining in FIG. 1. Sheet 2.2, facing away from wheel 1, of structure 2 is provided with honeycomb-shaped depressions delimiting chambers 3, 4. Chambers 3, 4 adjacent to one another in the circumferential direction of wheel 1 are connected together by a drainage opening 10, with arrow 11 showing the direction of the slope and hence the direction of motion of the contaminants to be carried away. Openings 7, 8 are each located in the centers of chambers 3, 4 and penetrate sheet 2.1 facing wheel 1. Chambers 3, 4 and openings 7, 8 are designed to correspond in this embodiment.

Figure 3:
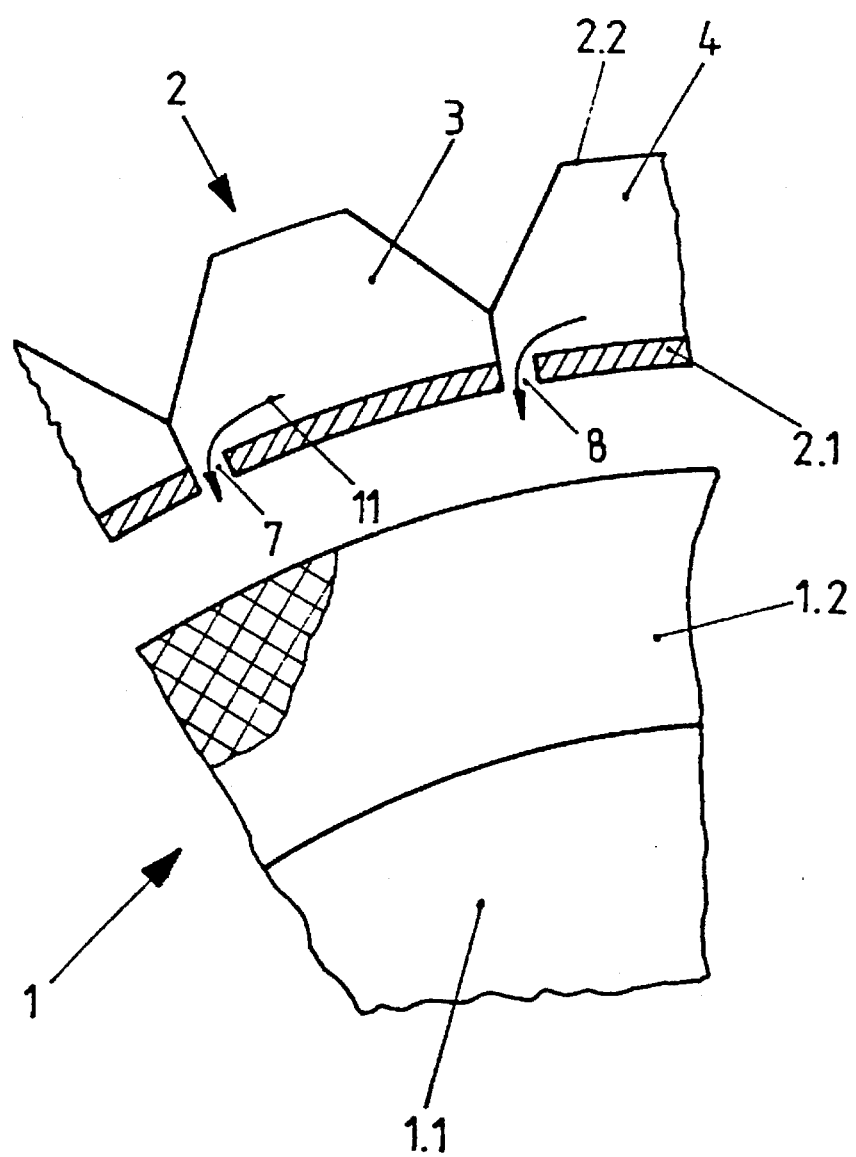
FIG. 3 shows a second embodiment in a section.

FIG. 3 shows a section of a second embodiment of a lining for a wheel 1, with openings 7, 8 being located on the lowest points of the respective chambers 3, 4. Any contaminants that penetrate chambers 3, 4 can be easily carried away in this design without accumulating inside chambers 3, 4. In this example, chambers 3, 4 are not connected to one another. The two sheets 2.1, 2.2 in this embodiment also have different thicknesses to ensure long service life without damage.

Figure 4:
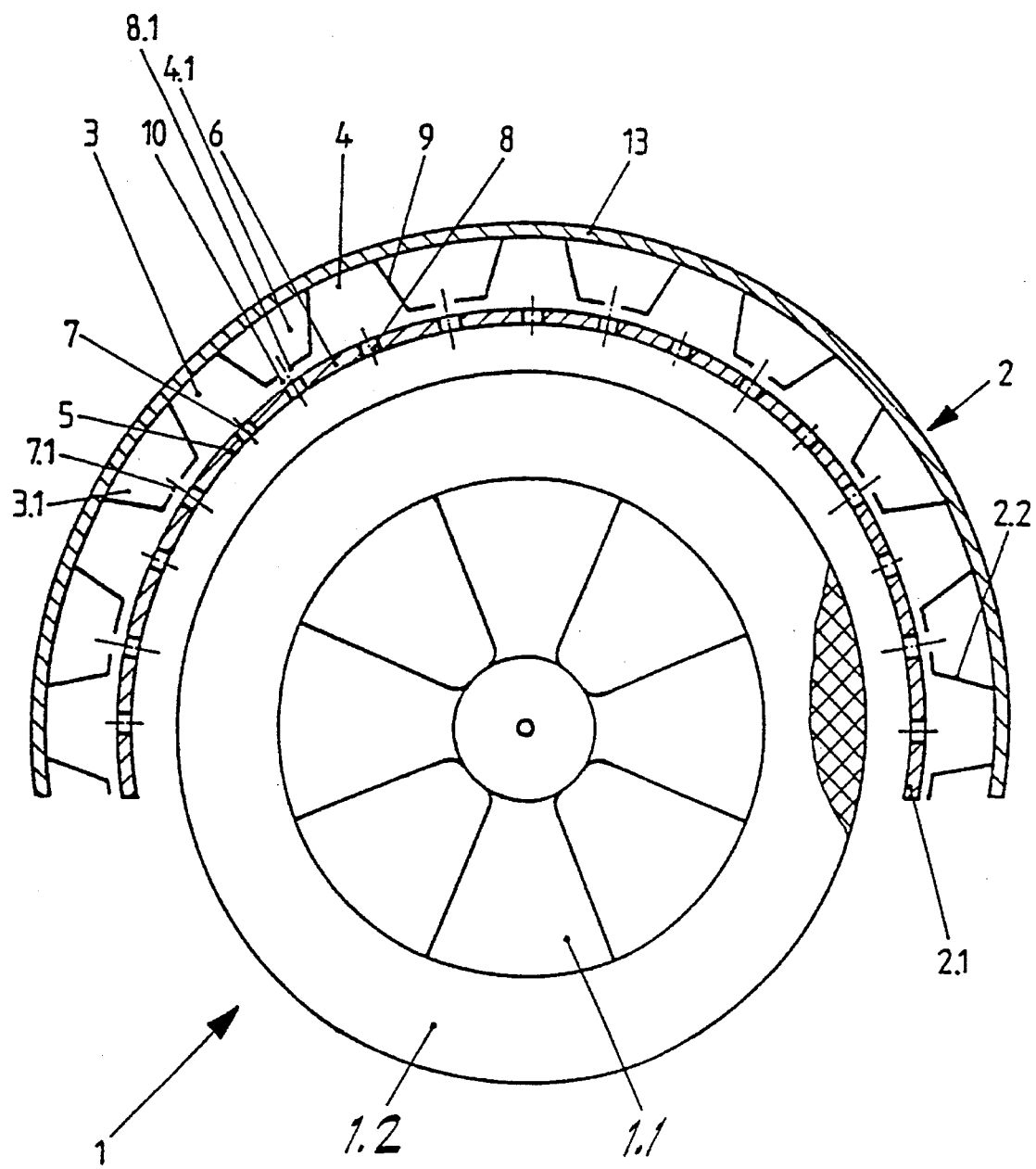
FIG. 4 is an embodiment similar to the embodiment in FIG. 1, with the lining being designed as a double-shell construction.

FIG. 4 shows a section of another embodiment, with the lining being designed as a double-shelled structure. Sheet 2.2 facing away from wheel 1 is located between sheet 2.1 facing the wheel and a polymer shell 13, which likewise can consist of a sheet. By virtue of this design, a second set of chambers 3.1, 4.1 can be formed in addition to originally available chambers 3, 4, whereby the depressions of the second set of chambers 3.1, 4.1, facing wheel 1, have openings 7.1, 8.1 located opposite openings in sheet 2.1 facing wheel 1. A minimal increase in manufacturing cost is offset against a definitely higher effectiveness regarding absorbing vibrations that occur depending on the road surface and tire profile.

Figure 5:
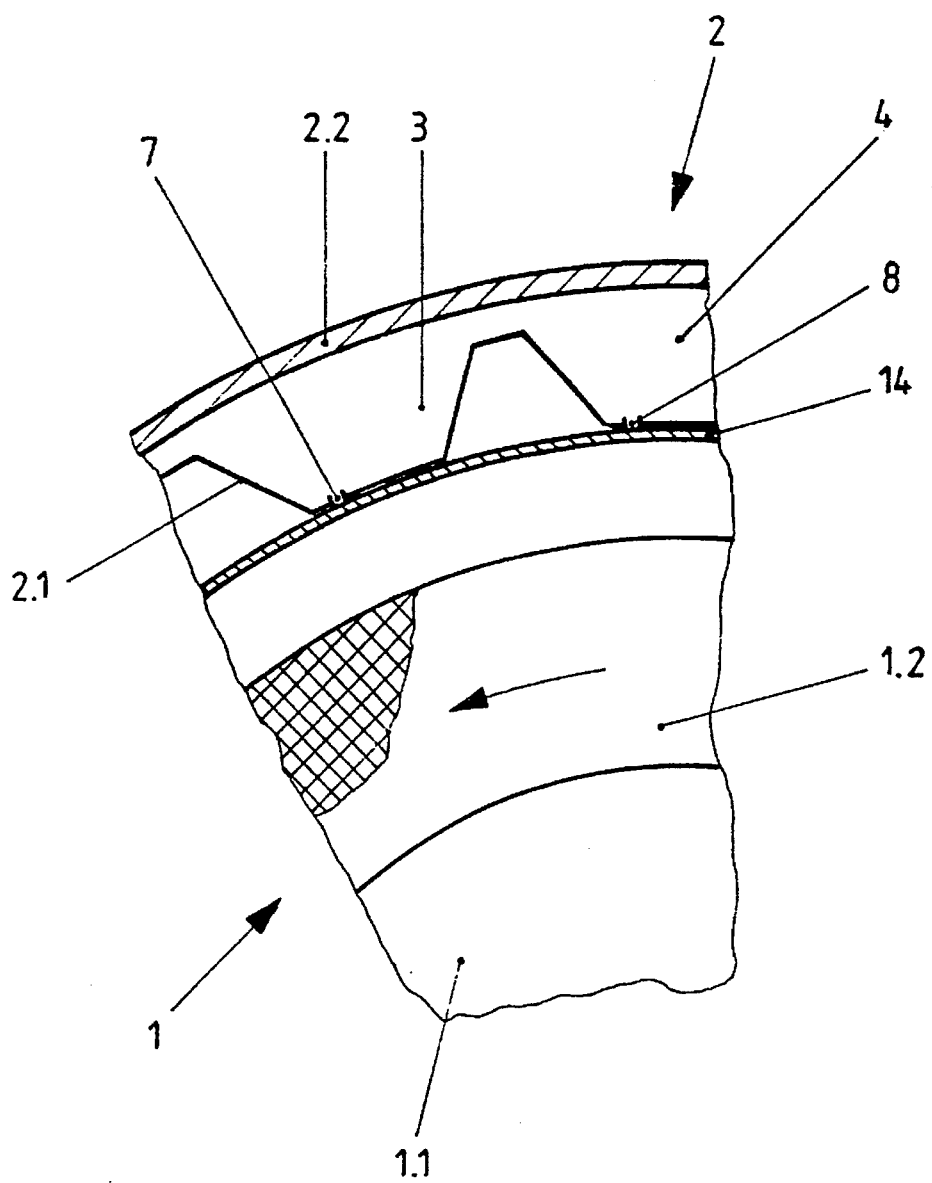
FIG. 5 shows an embodiment similar to the embodiment in FIG. 3, with a comparatively thicker sheet being mounted on the side of the thinner sheet facing away from the wheel, and with the openings in the thin sheet being covered by a corrosion-resistant covering.

In FIG. 5, sheet 2.1 facing wheel 1 is made comparatively thinner than sheet 2.2 facing away from the wheel. In order to protect comparatively thinner sheet 2.1 against damage, for example by thrown-up stones and other contaminants, the thinner sheet 2.1 is covered in the vicinity of its entire surface by a corrosion-resistant fleece covering 14. Fleece covering 14 is designed so that the adverse effects on the usage properties as regards absorption of acoustically disturbing vibrations are negligibly small. In this embodiment, the flow resistance of the fleece covering is 600 Ns/m$^3$.

While the present invention has been disclosed with respect to the above-described embodiments, it is contemplated that other embodiments may fall within the scope of the present invention.

What is claimed is:

1. A wheel lining mounted at a distance from a wheel comprising a structure having a first wall made of a material impermeable to air facing the wheel and a second wall facing away from the wheel, the structure having at least two chambers formed between the first and second walls, each chamber having at least one opening facing the wheel so as to form a Helmholtz resonator.

2. The lining as recited in claim 1 wherein the openings are located at a lowest point in each chamber.

3. The lining as recited in claim 1 wherein the first wall is a sheet of thermally weldable material and the second wall is a sheet of thermally weldable material.

4. The lining as recited in claim 1 wherein the first wall has a thickness three to five times that of the second wall.

5. The lining as recited in claim 1 wherein the second wall has cup-shaped depressions which define the chambers.

6. The lining as recited in claim 1 wherein the chambers are distributed in a honeycomb manner.

7. The lining as recited in claim 1 wherein adjacent chambers are connected by drainage openings.

8. The lining as recited in claim 1 wherein the structure is formed by deep-drawing.

9. A wheel lining mounted at a distance from a wheel comprising a structure having a first wall facing the wheel and a second wall facing away from the wheel, the structure having at least two chambers formed between the first and second walls, each chamber having at least one opening facing the wheel so as to form a Helmholtz resonator; and wherein the structure further comprises a third wall outside the second wall, a second set of chambers being formed between the second wall and third wall.

10. The lining as recited in claim 9 wherein each chamber of the second set of chambers has an opening facing the wheel and the first wall is provided with openings which correspond to the openings of the second set of chambers.

11. A wheel lining mounted at a distance from a wheel comprising a structure having a first wall facing the wheel and a second wall facing away from the wheel, the structure having at least two chambers formed between the first and second walls, each chamber having at least one opening facing the wheel so as to form a Helmholtz resonator; and further comprising a corrosion-resistant fleece which covers at least one of the openings.

12. The lining as recited in claim 1 wherein the fleece covering has a flow resistance of 400 to 1500 $Ns/m^3$.

* * * * *